(12) United States Patent
Dean (10) Patent No.: US 9,705,567 B2
(45) Date of Patent: Jul. 11, 2017

(54) DISTRIBUTED DATA STORAGE SYSTEM AND METHOD

(71) Applicant: Julian Benedict Dean, Egham (GB)

(72) Inventor: Julian Benedict Dean, Egham (GB)

(73) Assignee: Julian Benedict Dean, Egham (GB)

( * ) Notice: Subject to any disclaimer, the term of this patent is extended or adjusted under 35 U.S.C. 154(b) by 51 days.

(21) Appl. No.: 14/537,531

(22) Filed: Nov. 10, 2014

(65) Prior Publication Data

US 2016/0135318 A1    May 12, 2016

(51) Int. Cl.

| | |
|---|---|
| *H04B 5/00* | (2006.01) |
| *G06F 21/78* | (2013.01) |
| *G11B 23/28* | (2006.01) |
| *G06F 12/14* | (2006.01) |
| *G11C 5/14* | (2006.01) |
| *G06F 1/18* | (2006.01) |
| *G11B 33/08* | (2006.01) |
| *G11B 33/14* | (2006.01) |
| *H02J 50/10* | (2016.01) |

(52) U.S. Cl.
CPC ........... *H04B 5/0037* (2013.01); *G06F 1/187* (2013.01); *G06F 12/14* (2013.01); *G06F 21/78* (2013.01); *G11B 23/28* (2013.01); *G11B 33/08* (2013.01); *G11B 33/1446* (2013.01); *G11C 5/142* (2013.01); *H02J 50/10* (2016.02)

(58) Field of Classification Search
CPC ...... G06F 1/187; G11B 33/08; G11B 33/1446
See application file for complete search history.

(56) References Cited

U.S. PATENT DOCUMENTS

| | | | | |
|---|---|---|---|---|
| 4,642,715 A | * | 2/1987 | Ende .................. | G11B 33/1486 360/97.18 |
| 4,754,397 A | * | 6/1988 | Varaiya .................. | G06F 1/183 360/133 |

(Continued)

*Primary Examiner* — Adrian S Wilson
(74) *Attorney, Agent, or Firm* — Wenderoth, Lind & Ponack, L.L.P.

(57) ABSTRACT

A system for storing long-term digital data comprises data storage equipment including one or more data storage devices 26 stored in a sealed data storage module 10, which is positioned within a data center enclosure 101, which contains a body 12 that is surrounded by a strengthening shield 14. The body contains a network of tunnels 16. One or more data storage modules 10 are stored in a tunnel 16 that is inaccessible to human beings and comprises robotic movement means. Data can be stored before or after the data storage device 26 is sealed within the data storage module body. A utility distribution system can be positioned in proximity to the data storage module 10 for the utility distribution module to provide contactless power and network connection to the data storage module and for the data storage module to retrieve and transmit to the utility distribution module 34 data that is held in the data storage device 26. Powering of the data storage module occurs only when access to the data storage devices is required. One the other or both of the data storage module 10 and the tunnel 16 is operable to self-destruct when tampering is detected. The data storage module can also process the data stored under user instruction and store the results, including secure encryption and decryption of data.

16 Claims, 3 Drawing Sheets

(56) References Cited

U.S. PATENT DOCUMENTS

| | | | | |
|---|---|---|---|---|
| 4,967,155 A * | 10/1990 | Magnuson | G01R 33/1207 | 324/212 |
| 5,454,157 A * | 10/1995 | Ananth | G11B 33/121 | 29/467 |
| 6,289,678 B1 * | 9/2001 | Pandolfi | F25B 21/02 | 361/679.36 |
| 6,430,000 B1 * | 8/2002 | Rent | G11B 33/121 | 360/99.25 |
| 6,434,000 B1 * | 8/2002 | Pandolfi | F25B 21/02 | 136/204 |
| 7,719,828 B2 * | 5/2010 | Brown | G06F 1/187 | 361/679.31 |
| 7,890,207 B2 * | 2/2011 | Toscano | G11B 17/225 | 369/30.48 |
| 8,379,381 B1 * | 2/2013 | Tran | H05K 7/1461 | 361/679.33 |
| 8,514,514 B1 * | 8/2013 | Berding | G11B 25/043 | 360/97.11 |
| 8,570,719 B2 * | 10/2013 | Cleveland | G11B 33/1406 | 220/62.11 |
| 8,605,414 B2 * | 12/2013 | Moore | G06F 1/182 | 361/679.02 |
| 8,812,875 B1 * | 8/2014 | Melvin | G06F 21/78 | 380/277 |
| 2005/0057849 A1 * | 3/2005 | Twogood | G11B 33/022 | 360/97.12 |
| 2007/0035917 A1 * | 2/2007 | Hotelling | G06F 1/1632 | 361/679.56 |
| 2007/0236174 A1 * | 10/2007 | Kaye | H02J 7/025 | 320/112 |
| 2009/0096413 A1 * | 4/2009 | Partovi | H01F 5/003 | 320/108 |
| 2010/0081483 A1 * | 4/2010 | Chatterjee | H01F 1/15333 | 455/572 |
| 2010/0083012 A1 * | 4/2010 | Corbridge | G06F 1/1632 | 713/300 |
| 2013/0083472 A1 * | 4/2013 | McMaster | G06F 1/266 | 361/679.31 |

* cited by examiner

DISTRIBUTED DATA STORAGE SYSTEM AND METHOD

FIELD OF THE INVENTION

The present invention relates to a system, method and apparatus for securely storing digital data. More precisely, the invention relates to resilient and cost effective secure storage of digital data within a network of data centre enclosures.

BACKGROUND TO THE INVENTION

The amount of digital data present in the world is increasing at a very fast rate. The digital revolution that has overtaken our society in the previous 30 years has ensured that matters which would not previously have been the subject of storage and recovery are now routinely stored in a digital fashion. The coming to prominence of digital photography and digital video images has created an even larger source of digital information that is stored.

Much of data storage occurs in relation to the Internet. Billions of websites currently exists. Each website comprises words and images or video clips. The emergence of social and collective websites such as Facebook, Twitter, and You Tube, to name but a few, has meant the Internet presentation of immense amounts of photographic and video images, as well has written information.

The Internet is only the tip of an iceberg. Broadcasting organisations and government archives (including museums) all possess an immense amount of digital assets. In the case of the British Broadcasting Corporation (BBC) alone, hundreds if not thousands of terabytes of old and historical audio and video material require constant archival maintenance and protection against loss or damage. Google® (trademark) and Yahoo® (trademark), to name but two from many dozens of current search engines searching the entire Internet, maintain resumes and address maps each for at least some billions of websites so that Internet users can employ a search engine to search keywords to find one or more websites on a particular subject.

Quite apart from civilian use, government organisations in all countries keep and maintain records of all manner of material ranging from medical information, police information, security service information to military information. Although we may never get to know the extent of data are so stored and maintained, it is to be assumed to include many hundreds (if not thousands) of terabytes.

With the currently available technology, nearly all storage is on rotating disk drives that require large amounts of power to be provided in server farms that provide Internet access to material. A typical server farm can require between 10 and 100 MW of power. This means that a great deal of extra energy is used in cooling and ventilating server farms. Projections of world energy usage predict a significant proportion of power production to be used in connection with server farms.

In the past large amounts of stored digital data, such as historic websites and historic search engine content, have been discarded simply because the amount of storage available was not enough and nor was it fast enough. These server farms have come, only very recently, to preserve even more data. The use of so-called "cloud" services now involves individual archive material from individual computing machines being stored not within the individual machine itself (at least as an archive) but within a server disk in a machine in a server farm. This threatens to increase even more the amount of digital assets that require maintenance and security.

Threats to archived digital data come in many forms. Disk drives are prone to irreversible crashes. Cyber-attacks can be used to destroy or alter data. Power failure can disable access ability. Military attacks ranging from explosive destruction to magnetic pulse emission can destroy data stores.

It is an object of the present invention to enable long term secure digital data asset storage with minimised energy requirements. It is a further object of this invention to prevent the necessity for discarding of data for lack of storage capacity and to allow the data most likely to be accessed to be copied automatically to a storage facility where performance can be optimised using finite local resources.

It is a further object of this invention that the user experience of accessing their information should be independent of the physical locations in which the data is stored, and the locational dependencies should be totally transparent to the user, except for latency and transfer speed issues.

It is a further object of this invention to ensure that the user can determine criteria for selecting locations in which their data will be stored, and that those wishes should be enforced.

It is a further object of this invention that the network of data storage locations should respond to environmental conditions, and that data should be migrated automatically, or semi-automatically, to alternate locations in order to preserve the integrity of the data storage in accordance with the user's wishes.

It is a further object of this invention to allow the user to assign ownership of the stored data to another user, either on demand or according to a time schedule or in response to external events.

SUMMARY OF THE INVENTION

According to a first aspect, the present invention consists in a system for storing data, the system comprising:
a data storage module comprising:
an impervious sealed body operable to contain data storage equipment; where
the data storage equipment comprises a data storage device operable to store data; and
a data centre enclosure operable to receive and to securely store the data storage module.

According to a second aspect, the present invention consists in a method for storing data, the method comprising:
a step of employing a data storage module to store data; and
a step of securely storing the data storage module within a data centre enclosure.

The invention further provides that the data centre enclosure comprises a housing that can be either a tunnel or a micro housing. The invention further provides that when the storage housing comprises a tunnel, the tunnel is adapted to contain a utility distribution module (UDM) 34, the utility distribution module including an external data transfer unit. The invention further provides that the tunnel can also comprise a robotic moving apparatus operable to move the one or more data storage modules within the tunnel.

The invention also provides that the tunnel can be one of a plurality of tunnels and that the robotic moving apparatus is operable to move one or more data storage modules between tunnels.

The invention also provides that the moving apparatus can comprise at least one of: one or more pulleys moving and guiding a cable disposed along the tunnel; and one or more robotic vehicles operable to pull or push data storage data storage modules The invention also provides that either the utility distribution module (UDM) 34 can be maintained static within the tunnel and a selected data storage module is moved to be in proximity to the utility distribution module (UDM) 34; or
   one or more data storage modules can be maintained statically disposed within the tunnel and the utility distribution utility distribution module is moved into proximity with a selected data storage module; or
   both the utility distribution module and the data storage module can be moved within the tunnel until the utility distribution module is positioned in proximity to a selected data storage module.

Invention further provides that transmission of power and network connectivity can be transferred through a series of adjacent data storage modules, such that the utility distribution module can access data stored within any of the data storage modules.

Invention further provides that the data storage module can comprise:
a power supply; that the system can also comprise an external power source; where the power supply can be operable to co-operate with the external power source to provide electrical energy to power the data storage module.

Invention also provides that the power supply can be a contactless power supply and the external power source can be a contactless external power source.

The invention further provides that the data storage device can comprise at least one of: hard disc drive memory; ferroelectric integrated circuit memory; ferromagnetic integrated circuit memory; and flash memory.

The invention also provides that the body can be made from at least one of: welded stainless steel; welded and/or brazed metal; composite fibre material.

The invention also provides that the body can be surrounded by a strengthening shield; and that the strengthening shield can comprise concrete, steel, or ceramic material.

The invention also provides that the floor of the tunnel can be substantially level, or can be substantially vertical, that the tunnel can be substantially rectilinear, and that the tunnel can be located in a secure location.

The invention also provides that data can be stored in the data storage module 10 before the data storage module is sealed within the body 12 of the data centre enclosure 101, and/or data can be stored in the data storage module after the data storage module is sealed within the body 12.

The invention also provides data transfer can be; contactless; by means of contacts, plugs or sockets in the wall of the data storage enclosure; by optical means; and by any combination thereof; and that data can be transferred electronically between data storage modules; and that data can be transferred electronically between the data storage modules and any device external to the data storage enclosure.

The invention also preferably provides a micro storage enclosure that allows one or more data storage modules to be deployed within a secure container, with a simple door so that robots are not required to manipulate the data storage modules, which can be remotely monitored and maintained like a full sized data storage enclosure.

The invention also preferably provides a mechanism for managing the distribution of data across and within storage enclosures, such that the minimum number of storage media devices require power at any given time; and a mechanism for managing the distribution of storage access requests, such that the requirements for electrical power and heat dissipation are physically distributed across and within the storage enclosures, to avoid local hotspots and power surges, and bandwidth overloads.

The invention preferably also provides a mechanism that allows the individual users of the network of storage enclosures to select the storage enclosures in which their data will be stored by defining constraints that must be met and then ensures the selection is implemented.

The invention preferably also provides a mechanism that allows the owners of individual storage enclosures to provide pricing and other information, which can be used by the user in defining the selection criteria used in selecting the storage enclosures to be used for their data; and the invention also preferably provides a mechanism that allows all storage enclosures to be remotely monitored by a trusted party, who can update status information used by the user defined selection process, and coordinate with security services to protect storage enclosures that may be under attack, and coordinate with secure transport services to move data storage modules between storage enclosures.

The invention also preferably provides a mechanism that allows the data stored in the data storage modules to be destroyed in the event that security of the storage enclosure is compromised or the sensors indicate that the enclosure has come under attack.

Ideally the system also comprises a utility distribution module 34, positionable in proximity to the data storage module; the utility distribution utility distribution module comprising an external data transfer unit operable to transfer the representation of data to/from the utility distribution module.

Ideally the system can also comprise of a cooling module, positionable adjacent the data storage modules, which will circulate air/gas/fluid over the storage modules in order to dissipate heat throughout the storage enclosure.

The invention also provides that the utility distribution utility distribution module can be a cooling apparatus and that the moving apparatus can also move the cooling apparatus within the utility distribution module data centre enclosure 101.

The invention also provides that the moving means can comprise at least one of: one or more railway tracks laid along the tunnel; and one or more pulleys moving and guiding a cable disposed along the tunnel; and a robotic vehicle capable of pulling or pushing modules.

The invention also provides that one, the other or both of the data storage module and the data centre enclosure are operable to self-destruct in the event of tampering being detected.

BRIEF DESCRIPTION OF THE DRAWINGS

The invention is further explained, by way of examples, by the following description to be read in conjunction with the appended claims, in which:

DETAILED DESCRIPTION OF PREFERRED EMBODIMENTS OF THE INVENTION

Figure 1:
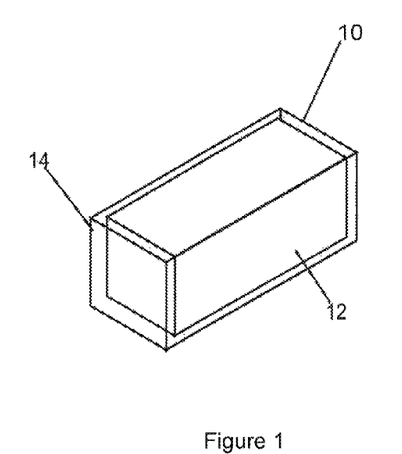
FIG. 1 shows an exemplary semi-transparent view of a data centre enclosure (DCE) 101 according to the present invention.

Attention is first drawn to FIG. 1, an exemplary semi-transparent view of a data centre enclosure (DOE) 101 according to the present invention.

A data centre enclosure 101 comprises a core 12 providing a body optionally surrounded by a strong durable outer layer 14, the composite structure serving as a data centre enclosure (DOE) 101.

The body 12 of a data centre enclosure 101 is preferably cubic or cuboidal in form, although the present invention permits the body 12 to have other shapes. Other shapes are suggested later in this description. The body 12 is preferably fabricated from strong metal. Such strong metal can include stainless steel. Stainless steel is preferred because of its strength, resistance to corrosion and low relative permeability allowing contactless communication to be achieved using several means. The body 12 can also be fabricated using plastics, ceramics and laminates which can be made strong and guarantee contact/contactless provision of power and communication there through if so required.

The body 12 is large enough and robust enough to contain functionable equipment capable of storing and recovering digital data. The body 12 is without any gaps that allow ingress or egress of gases or liquids. Furthermore, the body 12 does not have any gaps of any kind in its material surface. The body 12 thus provides an hermetic, waterproof, mechanically strong transportable container where in data storage equipment can be housed. The body 12 may have its interior flooded with inert gas during closure to prevent subsequent chemical degradation of its contents. Such inert gas can comprise, but is not limited to, nitrogen, helium, argon, krypton or xenon.

The body 12, although chemically and mechanically robust, is preferably further surrounded by a strengthening shield 14. The strengthening shield can be any continuous body that adds strength to the construction and provides further sealing to the body 12 it contains.

The strengthening shield 14 can comprise layers, such as, but not limited to concrete; and polymer layers further to improve the seal to the body 12.

As explained described later, the body 12 can also comprise through penetrating contacts permitting transfer of power and data. As another alternative, the body 12 is adapted for contactless power and data transfer.

It is also a function of the body 12 and the strengthening shield 14 to provide a thermally conductive path whereby any heat dissipated by the data storage and recovery equipment housed in the body 12 can be conducted to the outside of the strengthening shield 14. Such strengthening shield 14 external to the internal body 12 may contain heat extraction equipment that allows removal of heat from the overall data centre enclosure (DCE) 101 on those occasions when it is required.

As will be described later, one or more data storage modules 10 (DSM) are positioned into tunnels 16. It is another function of the strengthening shield 14 to cooperate with the body 12 to preserve the integrity of the data storage and recovery equipment within the body 12 against mechanical destruction resulting from tunnel 16 collapse.

To summarise FIG. 1, a data storage module 10 (DSM) is provided that is transportable, fluid impermeable and resistant against mechanical stresses from tunnel 16 collapse. It is the intention of the present invention to provide secure but accessible storage of digital data that can last from decades to millennia while keeping the stored digital data in readable and rapidly accessible form. Transportation of the data storage module 10 (DSM) to a secure facility (a data centre enclosure 101 (DOE) as described hereafter) is preferably by any one of, but not limited to any one or more of: railway; roadway; waterway; and air transportation. Transportation of the data centre enclosure 101 (DOE) to a permanent, semi-permanent, or temporary deployment location is preferably by any one of, but not limited to any one or more of: railway; roadway; waterway; and air transportation.

The data storage module 10 is an autonomous unit, which can be deployed within the data centre enclosure 101 (DOE) (as described hereafter), or externally to the data centre enclosure 101 (DOE.)

The structure of the data storage module 10 (DSM) is intended to facilitate long-term storage within a hermetically sealed data centre enclosure (DOE) 101, which requires robotic handling of the data storage module 10 (DSM) units, because human access is not desirable nor possible.

The structure of the data storage module 10 (DSM) facilitates thermal transfer to tunnel 16 walls of the data centre enclosure 101 (DOE) (described hereafter), and also to facilitate circulation of cooling fluids over or through the structure of the data storage module 10 (DSM).

Depending on the orientation of the storage tunnels 16 (explained hereafter) within the data centre enclosure 101 (DOE), the structure of the data storage module 10 (DSM) when placed adjacent to other data storage modules 10 (DSM) units will create a chimney, which will propagate heat dissipation by convection or circulation of fluid and that heat dissipation may optionally be assisted by mechanical means.

The data storage module 10 (DSM) design may optionally contain multiple chimneys for convection or circulation of cooling fluids. Optionally, the chimney surface may be formed by the surfaces of data storage devices 26 (described hereafter), and the data storage devices 26 may be physically attached to the outer surface of the data storage module 10 (DSM) as another alternative. Alternatively, the DSM may be designed to form part of the chimney, with the remainder being formed by the tunnel 16 within the data centre enclosure 101 (DCE).

Figure 2:
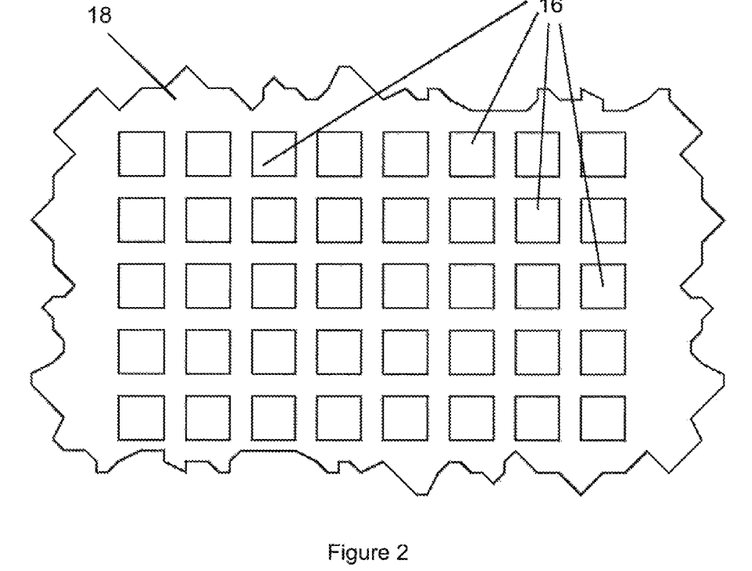
FIG. 2 is a cross sectional view of an exemplary system of storage tunnels wherein data archiving modules are stored on a long-term basis ready to be recovered and/or activated whenever stored data is required to be accessed.

Attention is next drawn to FIG. 2, showing a cross sectional view of an exemplary system of storage tunnels 16 where in the data storage modules (DSM) 10 are stored on a long-term basis ready to be activated whenever stored data is required to be accessed. The data centre enclosure forms a solid block of material, preferably reinforced concrete, which contains a network of tunnels 16 where in data storage modules (DSM) may be securely stored.

The storage tunnels 16 each comprise a stainless steel (for preference and corrosion resistance) lining surrounded by a layer of reinforced concrete 18, which form the body 12 of the data centre enclosure (DCE) 101, and is surrounded by a protective shield 14 preferably 1 m thick or more and providing a barrier between the body 12 and the outside world. The tunnels 16 may have, if required, one or more access shafts (not shown) whereby the data archiving storage modules 10 may be moved into the tunnels 16.

Access to the tunnel network 16 is provided by a secure airlock, (not shown) which ensures there is always 1 m of reinforced concrete between the core and the outside world, even when the airlock is being opened. The airlock is protected by a remotely controlled electronic lock, via a global storage management system (GSM).

The array of tunnels 16 constituting the body 12 of the data centre enclosure 101 (DCE) is designed to be fabricated in a factory, transferred to site on a lorry and installed in location, before the void between the tunnels 18 is filled with surrounding material via a number of filling holes.

The storage tunnels 16 can be oriented vertically or horizontally, and this decision will affect the robotic manipulation required by a Robotic Management System (RMS) (described later). Each storage tunnel 16 is preferably accessed via an access tunnel (not here shown) and all access tunnels will be accessed via a main tunnel (not here designated).

Fabrication of the data centre enclosure 101 (DOE) body, airlock, and tunnels 16 in stainless steel allows the complete unit to be produced in a factory, and conveyed to site on a standard container transport, because the complete structure is within transportation weight limits.

The site is preferably prepared by digging a hole and pouring concrete to form the base of the protective shell, which will be completely filled after the void between the tunnels, has been filled with concrete.

During installation of the data centre enclosure 101 (DOE) the tunnels 16 may be flooded with fluid, such as water, and sealed with a high pressure seal so the tunnels 16 are less likely to become deformed when concrete is poured into the void between tunnels 16.

The stainless steel fabricated tunnels 16 are connected with thermally conductive reinforcing struts during the manufacturing process, which will provide thermal conduction paths between the tunnels 16, so that localised heating within any tunnel 16 will be dissipated across all tunnels 16. Optionally pipe work connected to heat extraction equipment may be attached to the outer surface of the tunnels during manufacture to provide active cooling.

The concrete 18 used to fill the data centre enclosure 101 (DOE) provides mechanical strength, thereby preventing the tunnels 16 from collapsing if and when the data centre enclosure 101 (DOE) is subjected to mechanical or explosive attack, and will also provide thermal mass to dissipate greater quantities of heat.

The stainless steel tunnel 16 structure effectively distributes the heat across the entire volume of the data centre enclosure 101 (DOE), and the concrete surrounding material 18 will absorb the heat, which will eventually be dissipated through the protective shell into the surroundings.

Installation of the data centre enclosure 101 (DOE) underground effectively provides an infinite heat sink, which ensures that any heat generated within the data centre enclosure 101 (DCE) will eventually be dissipated into the earth, so that significant quantities of heat can be dissipated without causing significant increase in local temperatures within the data centre enclosure 101 (DCE), using a passive heat dissipation process that does not require any power source to function.

Assuming that the core 12 of the data centre enclosure 101 is in the vicinity of 12.2 meters long (equivalent to 40 Feet) and the protective shell is 1 m thick, then the total weight of the installed data centre enclosure including the protective shell will be approximately 500 metric tonnes, with a surface area in contact with the earth exceeding 250 square meters.

The total potential energy consumption of 10,000 Data Storage Unit, each containing five disks, each of which consumes 5 watts, will be 250 KW when all disks are in use. However, a global storage management system (GSM) ensures that less than 10% of the disks are powered at any time, so the maximum energy consumption of a fully populated Data Centre Enclosure (DCE) 101 will be less than 25 KW, which is not sufficient to increase the temperature of the data centre enclosure (DCE) 101 significantly above ambient.

The protective shell 14 is designed to be highly resilient to mechanical or explosive attack, and this resilience is greatly enhanced by the stainless steel tunnel 16 structure and connecting struts (not shown) and the concrete filling material 18. The resulting structure is designed to withstand mechanical attack using a demolition digger for a period in excess of 12 hours.

Vibration sensors within each data storage module (DSM) allow each unit to determine whether the Data Centre Enclosure 101 (DCE) is under attack, and network communication between the data storage module 10 (DSM) units via the Global storage management system (GSM) allows intelligent risk assessment within the Data Centre Enclosure 101 (DCE) and across the entire network.

The Global Storage Management System (GSM) (not shown) is responsible for making the risk assessment and for consequential actions, such as the option to self-destruction all Data Storage Module 10 (DSM) units within the Data Centre Enclosure 101 (DCE) that has been identified as being under attack.

The Data Centre Enclosure 101 (DCE) tunnels 16 are filled with argon (or other inert gas) for permanent fire suppression, and the gas is maintained at a slight overpressure to reduce the risk of ingress of liquid or gas into the Data Centre Enclosure 101 (DCE) through the fabric of its construction.

Physical security of the Data Centre Enclosure 101 (DCE) is significantly enhanced by the small dimensions of the tunnels 16 and airlock aperture, which for preference not exceed 30 centimeters in cross-section. This effectively guarantees that human access to the interior of the Data Centre Enclosure 101 (DCE) is not possible, meaning that access must be effected by robotic means. This significantly alters the threat profile, because an attacker must first bypass the physical barrier of the airlock, and must then be in possession of the robotic mechanisms and associated skills required to effect access to the Data centre Enclosure 101 (DCE).

Elimination of the possibility of human access to the Data Centre Enclosure 101 (DCE) also eliminates the health and safety requirements associated with human accessible workspaces.

This also has implications for town planning and building regulations, because the Data Centre Enclosure 101 (DCE) will not be classified as a building under the terms of the relevant acts of parliament, so physical location of these facilities will be subject to far less regulation than any conventional data centre.

Tunnel 16 design optionally includes a utilities channel, which allows structured cabling to be installed.

Structured cabling is used to distribute power and network connectivity from the Data Centre Enclosure 101 (DCE) connection points to a Utility Distribution Module (UDM) unit (not shown) in each tunnel 16.

The Data Centre Enclosure 101 (DCE) is provided with multiple connection points for external services, which are passed through the protective shell and into a patch panel in the main tunnel 16 (not shown) of the body 12. This allows redundant routing of power and network connections into the body 12.

The data centre enclosure 101 (DCE) may optionally include pipework in the surrounding material 18 between the tunnels 16, which can be connected to a ground source heat pump so that heat can extracted from the data centre enclosure 101 (DCE) for external applications, or can be circulated through pipework on the external surface of the protective shell to dissipate heat into the surrounding earth.

As an option, the data centre enclosures 101 (DCE) may be treated with anti-tamper paints, so that attempted penetration of the data centre enclosure 101 (DCE) surface will result in the release of noxious gas and/or permanent marking dye.

As another option, the data centre enclosure 101 (DCE) may be protected with steel armour or ceramic armour, including active armour, or mines design to disable mechanical destruction apparatus, or anti-personnel devices.

The data centre enclosure 101 (DCE) airlock may optionally be enclosed within an entry structure (not shown) which prevents the mechanism from being observed in operation. The structure may optionally contain a utility distribution module 34 (described later) (UDM) plus additional data storage module 10 (DSM) units, so that multiple data storage module (DSM) units 10 can be delivered to or retrieved from the data centre enclosure 101 (DCE) in a very short period of time, because the insertion or extraction of data storage module (DSM) units 10 can be performed off-line by the robotic management system (RMS). The entry structure may optionally be reinforced or armoured, and may include dual key access controls, which require collaboration between the global storage management system (GSM) and local staff.

Electricity generators, batteries, power management equipment, and network connection equipment may optionally be installed within the entry structure.

The tunnels 16 of the data centre enclosure 101 (DCE) may optionally be metallic and totally sealed to form a faraday cage, which will protect the data storage modules 10 (DSM) units from electromagnetic interference, including destruction by electromagnetic pulse. The outer surface of the data centre enclosure 101 (DCE) may optionally also be metallic and totally sealed to form a faraday cage, which provides further protection. The data storage modules 10 (DSM) units may also be metallic and sealed to form a faraday cage for additional protection. Entry points into these faraday cages must be designed to eliminate waveguide effects, which would compromise the shielding effects, particularly when the data centre enclosure 101 (DCE) is being accessed through the airlock.

Radio and/or optical communication equipment may be included within the fabric of the datacentre enclosure 101 (DCE), which will facilitate wireless communication and/or power transfer to the utility distribution module (UDM) units (not shown), which will eliminate the need for wires.

Each data storage module (DSM) needs to be manipulated within the data centre enclosure 101 (DOE) 16 tunnels without getting stuck, because there is no human access within the tunnels 16, so the surfaces of the data storage modules 10 (DSM) may be angled and/or coated with low-friction material to prevent jams.

Figure 3:
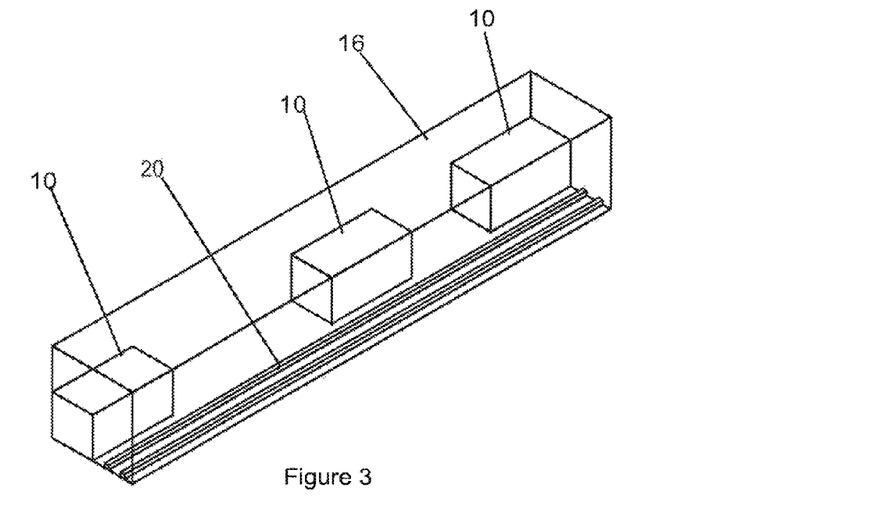
FIG. 3, shows an exemplary single tunnel with data storage modules (DSM) 10 placed therein.

Attention is next drawn to FIG. 3, showing an exemplary single tunnel 16 with data storage modules 10 placed therein. A tunnel 16 extends in a substantially horizontal manner into the surrounding material 18. The data storage modules (DSM) 10 are positioned, using robotic means, at intervals along the tunnel 16. Although the data storage modules 10 shown in FIG. 3 are placed just on one wall of the tunnel, depending upon the relative sizes of the tunnel 16 dimensions and the dimensions of the data storage modules 10, the data storage modules 10 can be stacked on both walls of the tunnel 16 and at other positions between the tunnel 16 walls. The invention also provides that, within a tunnel 16, data storage modules 10 may be stacked one upon another. The only requirement is that data storage modules 10 can be placed within a tunnel 16, moved within a tunnel 16, and electronically accessed from within a tunnel 16.

It is to be understood that the invention can also comprise, rather than or together with a data centre enclosure (DCE) 101, a micro storage enclosure (not shown) which provides a secure container, with a simple door so that robots are not required to manipulate the data storage modules, which can be remotely monitored and maintained like a full-size data centre enclosure 101.

Figure 4:
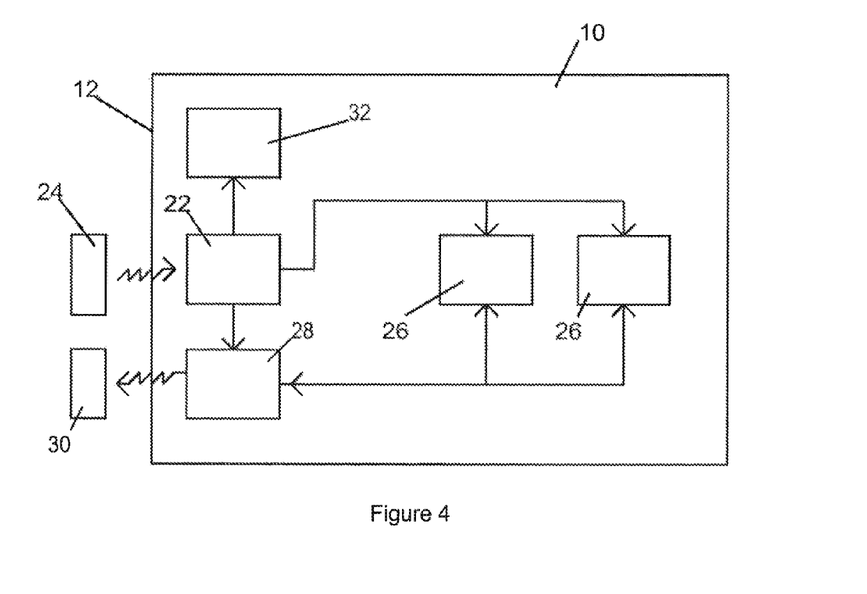
FIG. 4 is an exemplary block diagram illustrating contents of a typical data storage module (DSM) 10.

Attention is next drawn to FIG. 4, an exemplary block diagram illustrating contents of a typical data storage module 10 (DSM).

The data storage module 10 comprises data storage apparatus is mounted therein.

A first item in the data storage apparatus is a power supply 22 that can be either contactless or cable supplied and is provided with power by means of an external power source 24. The power supply 22 can be any means of power supply that can provide power without breaking of the inherently sealed condition of the data storage module 10. As one example, the external power source 24 can be a radio frequency magnetic field generator that has been shown to be, in practical use, operable to cause a resonant magnetic coil in the power supply 22 placed at a distance.

In another example of a power supply 22, a magnetic field, driven by coils in the external power source 24, can be sent through ferromagnetic contacts to match with corresponding ferromagnetic contacts within the contactless power supply 22, sending the magnetic field through the wall of the data storage module 10. As time goes by, further means for providing contactless electrical power will be developed. It is to be understood that the invention allows for any means of contactless provision of electrical power to be employed. The power supply 22 can also be fed by a cable connection giving electrical contact provided by the external power source 24.

The power supply 22 provides electrical power to apparatus within the data storage module 10. A first apparatus consists in one or more data storage devices 26. The data storage devices 26 can comprise any suitable data storage means. The data storage devices 26, if there is more than one of them, can comprise storage media of different kinds. In the present art, the data storage devices 26 can comprise, but are not limited to: hard disk drives; ferroelectric memories; optical memories; and flash memories.

It is to be appreciated that the present invention includes using any form of data storage media as data storage. In the future, there will be developments in data storage. At this time, possible developments include: three-dimensional integrated circuit memories; monolithic crystal storage memories; and non-degenerating flash memories. There are, of course, other means of improved data storage on the horizon. It is to be appreciated that the present invention includes the use of any present or future data storage means and apparatus as a data storage devices 26.

It is to be preferred that the data storage module 10 includes more than one data storage device 26 to prevent against data loss and degeneration. Where the data storage device 26 comprises a hard disk drive (usually multi-platter) there is a risk of catastrophic failure that cannot be recovered despite the presence of error detection and correction codes. In integrated circuit memories, natural background radiation causes particle bombardment resulting in a statistical loss of binary digits, once again not always correctable by inbuilt error detection and correction codes.

The presence of plural data storage devices 26 enables a non-failed data storage device 26 to provide missing data. Where there is a problem deciding what data should be, three or more data storage devices 26 can be used to provide a majority decision where the "odd man out" data storage device 26 is ignored. Such logic may be distributed across multiple data storage modules 10, which may be distributed across multiple data centre enclosures 101.

The power supply 22 also provides electrical energy to drive a data transfer module 28 within the data storage module 10. The data transfer module 28 co-operates with the data storage devices 26 to recover, when required, data stored there in. The data transfer module 28 co-operates wirelessly or through contacts with an external data transfer unit 30 to provide the external data transfer unit 30 with data access to the data storage devices 26. The data transfer module 28 and the external data transfer unit 30, within the invention, can use any form of mutual communication that does not breach the integrity of the data storage enclosure 10.

Such communications can include, but are not limited to: electrical; optical; magnetic; acoustic; and radio frequency. It is to be noted that the data transfer speed between the data transfer module 28 and the external data transfer unit 30, although preferred to be rapid, need not be so for the invention to function. The data integrity is of paramount importance and it is preferred that data integrity is maintained.

The power supply 22 also powers environmental equipment 32 within the data storage module 10. The environmental equipment can include, but is not limited to; moisture removing equipment; dust and data pre-removing equipment; cooling equipment; and heating equipment. It is also envisaged, within the invention, that photographic equipment coexist within the data storage module 10, together with sensors and monitors of all kinds to assess conditions within the data storage module 10. It is also provided within the invention to include internal condition monitoring means that can return images and sensor readings to the outside world via, for example, the data transfer module 28.

The data transfer module 28 and the external data transfer module 30 will contain a computer processor and memory, which may optionally be used to process the data stored on the data storage devices 26. Such processing may include, but is not limited to, secure encryption and decryption of the data for the purpose of searching and/or processing the stored data, secure authentication of user access to the stored data, pre-emptive caching of data that is likely to be accessed in the near future on another data storage device, modification of encryption security to allow other users to access the stored data, analysis of the data to create new data that may be stored and/or transmitted to the user, execution of user defined programs that manipulate the stored data using map-reduce or other processes.

The processing performed by the data transfer module can be executed on any data storage module 10 that contains the required data, so selection of the appropriate data storage module can take into account heating, power, and network connectivity within each available data storage module 10.

The invention also allows for a DSM 10 to act as a pre-emptive cache for other DSM units, so that the other DSM units can remain turned off for a greater proportion of the time. DSM units used for this purpose are likely to utilise solid state devices for storage, because of the reduced power consumption and access latency compared with rotational disks.

The invention also allows for a battery (not shown) to be included in the data storage module 10 (DSM).

Figure 5:
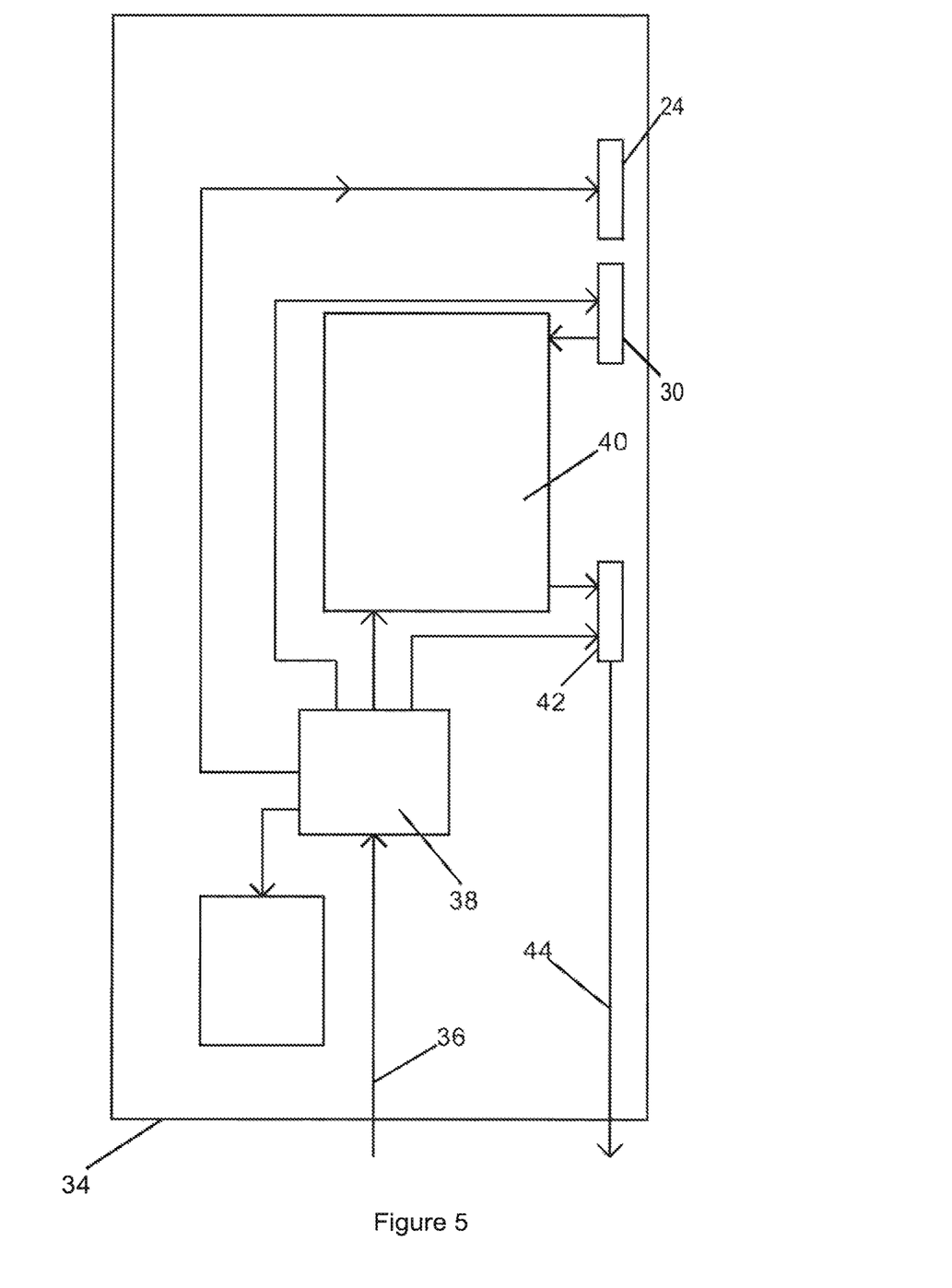
FIG. 5 is a block diagram showing exemplary contents of a utility distribution utility distribution module that provides utility services within the storage tunnel for the stored data storage modules.

Attention is next drawn to FIG. 5, a block diagram showing exemplary contents of a utility distribution module 34 that provides services within the tunnel 16 for the data storage modules 10. The utility distribution module 34 can be moved within the tunnels by the robotic management system (RMS). The utility distribution module can also be self-moving to position other items within the tunnel 16.

The data storage module 10 and the utility distribution module 34 can co-operate to retrieve stored data from the data storage modules 10 by the utility distribution module 34 being positioned in proximity to a data storage module 10 and activated.

The utility distribution module 34 is provided within a tunnel 16. The utility distribution module 34 has two options as to how it is positioned to interact with the data storage module 10. In a first option, the utility distribution module 34 is maintained in a fixed position within a tunnel 16 and individual data storage modules 10 are moved to lie in proximity to the utility distribution module 34. In a second option, the data storage module 10 remains still and the utility distribution module 34 is moved in the tunnel 16 to lie in proximity to the static data storage module.

The utility distribution module 34 can also provide access to a series of adjacent data storage modules 10, with power and network connectivity passed from one DSM to the next.

The utility distribution module 34 is powered by means of a power connection 36. The power connection 36 can be single phase or three-phase. The power connection 36 can be DC, or can be AC at any convenient voltage or frequency. The power connection 36 can be provided by, but not limited to: extendable cable; the inside wall of the tunnel 16; overhead wires; and detachable and re-attachable plugs disposed at intervals within the tunnel. The invention can operate with any type of power connection 36. All that matters for the invention is that the utility distribution module 34 should be provided with power. It is another option that the individual data storage modules 10 can enjoy a permanent power connection and be selectably controlled to be on or off.

The power connection 36 provides input to a central power source 38 that conditions the input from the power connection 36 to provide activating energy for various elements within the utility distribution module 34.

The central power source 38 powers the external power source 24 that provides (as shown in FIG. 4) power to the power supply 22 in the data storage module 10.

The central power source 38 also powers the external data transfer unit 30 that accepts recovered data from the data transfer module 28 contained within the data storage module (DSM) 10.

The external data transfer unit 30 can also, as an option, transfer recovered data to a cache 40 that stores, at least temporarily, data recovered from the data storage modules 26 of the data storage module 10.

The central power source 38 also powers a data transmitter 42 that sends data from the cache 42 into a data connection 44 to be received by external equipment for the recovered data to be restored. The data connection 44 can be of any known format, including, but not limited to: conductor; fibre optic; cable; and wireless link.

The utility distribution module 34 also can provide tunnel ventilation and cooling equipment 46. Although the tunnel ventilation equipment 46 as shown within the utility distribution module 34 and powered by the central power source 38, the tunnel ventilation equipment 46 can be otherwise powered and situated elsewhere at one or more positions within the tunnel 16.

In use, a storage user first includes the data to be stored into the data storage device 26 or devices 26. The equipment of the data storage module 10 (DSM) is then fixed within the data storage module 10. The data storage module (DSM) 10 is then sealed and coated as earlier described. The data storage module 10 (DSM) is then moved to and into a tunnel 16 and positioned therein. The data storage module 10 (DSM) remains without being powered for long periods, possibly decades or centuries. Only when recovery of the data stored there in is required is the data storage module 10 (DSM) powered to recover the data. It is also possible, within the invention; periodically to power each data storage module 10 (DSM) to ensure function and to charge any battery devices that may be included there in.

It is an alternative within the present invention that a user may seal the data storage module 10 (DSM) before providing data to be archived to the data storage device 26. In this instance, the data transfer module 28 must also be capable of providing data input to the data storage devices 26 as well as recovering data from the data storage devices 26.

It is another option of the present invention that each data storage module 10 (DSM) is part of an overall network that allows data to be retrieved or stored as a consequence of external access.

When the time comes, the utility distribution module 34, as described above, is positioned in proximity to the data storage module 10 and data recovered therefrom. Other means of powering and data recovery are a possibility as described above and hereafter.

It is also another alternative to the present invention that the cache 40 can be provided with update data to be added to the data storage devices 26. In this instance, the external data transfer unit 30 must be capable of providing data to the data transfer module 28 which must also be capable of storing data within the data storage devices 26.

Once data acquisition or update has been completed, the data storage module 10 (DSM) is powered down and remains powered down until further visited by the utility distribution module 34 or otherwise accessed for data recovery and/or storage.

Movement of the data storage modules 10 (DSM) and of the utility distribution module 34 have been described Railway tracks are a non-preferred option. A better option is for motor driven pulleys to be positioned within a tunnel 16 and cables passed along a tunnel 16. Objects to be moved can be attached thereto. Attached objects can be moved into, out of and along a tunnel 16 by rotation of the pulley. It is another option that a robotic management system within a tunnel 16 can move objects and items along the tunnel 16.

While it is preferred that the utility distribution module 34 is protected against corrosion and other life-limiting threats similarly to the data storage module 10, the present invention allows for the utility distribution module 34 to be otherwise enclosed and protected. The invention further allows for the utility distribution module 34 to be in a fixed position within a tunnel 16 and for the data storage modules 10 to be moved individually into proximity thereto. It is yet another option that the utility distribution module 34 provides for power connection and data connection for each data storage module 10.

It is preferred that each individual tunnel 16 comprises its respective utility distribution module 34. It is to be understood that, within the invention, a utility distribution module 34 can also be movable between tunnels 16 so that one utility distribution module 34 can service more than one tunnel 16.

In addition to data storage devices 26, the data storage module 10 (DSM) also contains processor and power supply modules, and may optionally contain a battery and a bus-bar to transfer power and network connections between the DSM units on either side.

The power and network connections between adjacent data storage module 10 (DSM) units can be transferred via a connector, which is designed to support robotic connection and disconnection. This connector can utilise physical contacts or can utilise a contactless means of connection.

The data storage module 10 (DSM) may also optionally contain a locking or braking mechanism, which operates under the control of the processor, such that when activated the data storage module 10 (DSM) is prevented from moving along the tunnel 16. This mechanism can be used in combination with the robotic management system (RMS) 34 to facilitate connection or disconnection of adjacent data storage module 10 (DSM) units.

The locking or braking mechanism may optionally utilise indentations in the data centre enclosure 101 (DCE) tunnel 16 wall, in order to provide precision location of the data storage module 10 (DSM) relative to the tunnel 16 wall. The locking mechanism is preferably designed to fail-safe in the open position, to prevent data storage module 10 (DSM) units becoming jammed in the data centre enclosure 101 (DCE) tunnels 16

The 'bus-bar' that transfer power and network connections between opposite sides of the data storage module 10 (DSM), may be comprised of physical wires, rods, or bars which are capable of transferring power or network signals, including the use of fibre or other optical transports or metallic or super-conducting materials.

The shape of the outer surface of the data storage module 10 (DSM) is designed to provide automatic alignment of adjacent units, when they are pushed into proximity; such that the data centre enclosure 101 (DOE) tunnel 16 provides sufficient macro alignment that the data storage module 10 (DSM) outer surface structure can provide micro alignment, which will ensure satisfactory connection between adjacent units.

Connectors on the data storage module 10 (DSM) are designed to possess a resilient, which will not be affected by normal seismic activity in the surrounding environment. In the event of the data centre enclosure 101 (DCE) being mounted within a vehicle then the connectors will be designed to provide resilience to the anticipated mechanical shocks to the data centre enclosure 101 (DCE).

The process for installing a new data storage module 10 (DSM) within a tunnel 16 is that the robotic management system (RMS) will disconnect the utility distribution module (UDM) (briefly mentioned above) from the from the data storage module 10 (DSM) then connect a new data storage module 10 (DSM) to the existing ones and then reconnect the utility distribution module (UDM). During this process the robotic management system (RMS) may remotely operate the locking/braking device on the data storage module 10 (DSM) and the utility distribution module (UDM) units, so that force applied by the robotic management system (RMS) will act on the connector, rather than just moving all the units.

For preference, the power supply 22 is designed to take power from the 'bus bar' that preferably provides AC current at 120-240 volts, which will be converted by the power supply 22 to provide the internal power requirements of the data storage module 10 (DSM).

The power supply 22 may optionally be designed to support remote switching via the network connection, such that the data storage module 10 (DSM) can be turned on or off via a remote signal, enabling dual controls on the operation of each data storage module 10 (DSM) for security or power management purposes.

The remote switching mechanism may optionally provide cryptographic authentication of switching events, and such authentication may be implemented independently to the cryptographic authentication used by the processor, which controls electronic signals access to the storage media devices.

The power supply 22 may optionally include a thermal and voltage cut-out, which protects the data storage module 10 (DSM) from environmental conditions which may have potential to damage the units.

The data storage module 10 (DSM) units are designed to be autonomous units, which are designed for self-preservation, under extreme environmental conditions. This may optionally include resilience to electromagnetic pulse events, through implementation of the data storage module 10 (DSM) outer surface as a faraday cage, which acts independently of the faraday cage formed by the datacentre enclosure 101 (DOE) tunnel 16 surface structure.

The data storage module 10 (DSM) units may optionally contain a self-destruct mechanism, which can be activated remotely under the control of the Global Storage Management (GSM) or may be activated autonomously by the processor within the data storage module 10 (DSM) or may be activated by an independent component within the data storage module 10 (DSM)

The processor within the data storage module 10 (DSM) may include a trusted platform module (TPM), with hardware encryption; so that encryption and decryption of data stored within the data storage module 10 (DSM) can be effected using secure key management.

It is preferred that the data owner may authorised decryption of data within the data storage module 10 (DSM) unit for the purpose of allowing the data to be processed within the data storage module 10 (DSM) under instruction from the data owner and allowing the outputs of the processing to encrypted and stored within the data storage module 10 (DSM), such that the results of the processing could be made available to an external user without ever compromising the physical security of the source data.

The data storage module 10 (DSM's bracket may optionally contain a battery (not shown), which allows the processor to be powered, when there is no power connection to the status storage module 10 (DSM) unit. The battery power may also be used to power the self-destruct process. This could take the form of powering the data storage module 10 (DSM) so that the processor can overwrite all data on the storage media devices, or alternatively it could be used to generate high-voltage discharges or electromagnetic fields in the region of the devices, or it could use the battery chemicals to destroy the devices.

The data storage module 10 (DSM) is preferably designed to require minimal power, and can optionally ensure that a very small proportion of the storage media devices can be powered at any given time.

The data storage module 10 (DSM) preferably comprises a utility distribution module connector, which allows the robotic management system (RSM) to achieve a secure physical connection to between the modules, so that they can be pushed or pulled into position.

The data storage module 10 (DSM) is expected to weigh in excess of 10 kg, and needs to be moved by the robotic management system (RSM), so the data storage module 10 (DSM) may be mounted on wheels, bearings or low-friction skids.

The status storage module 10 (DSM) needs to be manipulated within the data centre enclosure 101 (DCE) tunnels 16 without getting stuck, because there is no human access within the tunnels 16, so the corners and edges of the data storage module 10 (DSM) may be angled and coated with low-friction material to prevent jams.

The robotic management system (RMS) is designed to transfer data storage module 10 (DSM) and utility distribution module UDM units 34 into the data centre enclosure 101 (DCE) and to manipulate the units within the data centre enclosure 101 (DCE).

The tunnels 16 and the airlock within the datacentre enclosures 101 (DCE) are expected to be less than 30 cm in diameter, and the datacentre enclosure 101 DCE is expected to remain operational for in excess of 100 years, which means that the robotic management system (RMS) cannot realistically be built into the structure of the datacentre enclosure 101 (DCE).

A data storage module 10 (DSM) is expected to weigh in excess of 10 kg, which means that the robotic management system (RMS) must be capable of moving loads up to 25 kg.

If the storage tunnels of the datacentre enclosure 101 (DCE) are oriented vertically, then the robotic management system (RSM) may include a mechanism to lower the units into the storage tunnels 16, or alternatively the robotic management system (RSM) may include a mechanism to raise the units into the tunnel 16 from the base of the tunnel 16.

If the storage tunnels 16 are oriented horizontally, then the robotic management system (RSM) may include a mechanism to lower or raise units within the main tunnel 6 and a mechanism to move units to/from the access tunnels 16, including the robotic management system (RSM) unit itself.

While the invention has been heretofore described as comprising data storage devices 26 and power supplies 22 which are both contactless, the invention is to be understood as including power supplies 22 and data storage modules 26 accessible using contact or optical transfer means.

It is to be understood that the invention also comprises storage place selection means, and inclusion of a network whereby individual sets of stored data may be accessed without presence or movement of a utility distribution module. It is also to be understood that the invention also comprises network planning and connection means operable to allow a user to join and gain access into a network of data storage enclosures 101 and the data storage modules 10 contained therein.

Those skilled in the art will be aware of modifications and variations that can be applied to the embodiments described above without departing from the invention as claimed here below. For example the DSM may optionally be constructed as an articulated unit, in a similar manner to the carriages of a train, which can be positioned within the tunnel by the RMS.

The invention is further defined and clarified by the following appended claims.

The invention claimed is:

1. A system for storing data, the system comprising:
a data center enclosure which is operable to receive and to securely store at least one data storage module, the data center enclosure comprising:
at least one tunnel,
a robotic management system operable to move the at least one data storage module within the at least one tunnel, and
an airtight door operable to control access to the at least one tunnel;
wherein each of the at least one tunnel comprises a utility distribution module operable to distribute power and network connectivity to the at least one data storage module;
wherein the at least one data storage module comprises an impervious sealed body containing data storage equipment; and
wherein the data storage equipment comprises a data storage device operable to store data to be archived.

2. The system for storing data of claim 1, wherein the utility distribution module is positionable in proximity to the at least one data storage module, the utility distribution module comprising an external data transfer unit operable wirelessly to receive a representation of archived data from the at least one data storage module.

3. The system for storing data according to claim 1, wherein:
the at least one tunnel is one of a plurality of tunnels, and therein the robotic management system is further operable to move the at least one data center enclosure between the plurality of tunnels.

4. The system for storing data according to claim 3 wherein the robotic management system comprises at least one of:
one or more railway tracks laid along the plurality of tunnels:
one or more pulleys moving and guiding a cable disposed along the plurality of tunnels; and
one or more robotic vehicles operable to pull or push data storage in the data center enclosures.

5. The system for storing data according to claim 4 wherein:
either the utility distribution module is maintained static within a respective one of the plurality of tunnels and a selected data storage module is moved to be in proximity to the utility distribution module; or
the at least one data storage module is maintained statically disposed within the respective one of the plurality of tunnels and the utility distribution module is moved into proximity with a selected data storage module; or
both the utility distribution module and the at least one data storage module are moved within a respective one of the plurality of tunnels until the utility distribution module is positioned in proximity to a selected data storage module; or
both the utility distribution module and the at least one data storage module remain static and in connection.

6. The system for storing data according to claim 1 wherein the at least one data storage module comprises:
a power supply;
wherein the system further comprises an external power source; and
wherein the power supply is operable to co-operate with the external power source to provide electrical energy to power the at least one data storage module.

7. The system for storing data according to claim 6 wherein:
the power supply is a contactless power supply; and
the external power source is a contactless external power source.

8. The system for storing data according to claim 1 wherein the at least one data storage module comprises at least one of:
hard disc drive memory;
ferroelectric integrated circuit memory;
ferromagnetic integrated circuit memory; and
flash memory.

9. The system for storing data according to claim 1, wherein a body of the at least one data storage module is made from at least one of:
welded stainless steel;
welded metal;
brazed metal; and
composite fiber material.

10. The system for storing data according to claim 9 wherein:
the body is surrounded by a strengthening shield.

11. The system for storing data according to claim 1 wherein:
the at least one tunnel is fabricated from stainless steel and is surrounded by concrete.

12. The system for storing data according to claim 1 wherein:
a floor of the at least one tunnel is one of substantially level and substantially vertical.

13. The system for storing data according to claim 1 wherein:
the at least one data storage module is operable to self-destruct in an event of tampering.

14. The system for storing data according to claim 1 wherein:
the data center enclosure is operable to self-destruct in an event of tampering.

15. The system for storing data according to claim 1 wherein a data transfer is achieved according to at least one of:
contactless data transfer;
data transfer by way of contacts, plugs and sockets in a wall of the at least one data storage module; and
data transfer by optical means.

16. A method of storing data, the method comprising:
providing a data center enclosure, which is operable to receive and to securely store at least one data storage module to store data to be archived;
providing at least one tunnel in the data center enclosure;
providing the at least one data storage module as an impervious sealed body containing data storage equipment, the data storage equipment comprising a data storage device operable to store data to be archived;
employing a robotic management system operable to move the at least one data storage module within the at least one tunnel, each of the at least one tunnel comprising a utility distribution module operable to distribute power and network connectivity to the at least one data storage module; and providing an airtight door which is operable to control access to the at least one tunnel.

* * * * *